(12) United States Patent
French (10) Patent No.: US 7,347,597 B2
(45) Date of Patent: Mar. 25, 2008

(54) SAFETY LIGHT BAR WITH A LIGHT FIXTURE ASSEMBLY

(75) Inventor: Craig French, Suring, WI (US)

(73) Assignee: Great Lakes Manufacturing Inc., Suring, WI (US)

( * ) Notice: Subject to any disclaimer, the term of this patent is extended or adjusted under 35 U.S.C. 154(b) by 76 days.

(21) Appl. No.: 10/989,435

(22) Filed: Nov. 17, 2004

(65) Prior Publication Data

US 2005/0105296 A1    May 19, 2005

Related U.S. Application Data

(60) Provisional application No. 60/520,299, filed on Nov. 17, 2003.

(51) Int. Cl.
*B60Q 1/02* (2006.01)
*B60R 3/00* (2006.01)

(52) U.S. Cl. ............. 362/485; 362/505; 362/540; 362/544; 340/468; 280/164.1

(58) Field of Classification Search ......... 362/505, 362/540, 543, 544, 485; 206/38.1, 37; 116/36; 340/436, 468; 439/34–36; 280/164.1
See application file for complete search history.

(56) References Cited

U.S. PATENT DOCUMENTS

| | | | | |
|---|---|---|---|---|
| 3,059,105 A | * | 10/1962 | Roe et al. | 362/250 |
| 3,380,022 A | * | 4/1968 | Raschke | 116/36 |
| 3,439,324 A | * | 4/1969 | Kirimoto et al. | 116/36 |
| 3,442,347 A | * | 5/1969 | Hodgson et al. | 180/169 |
| 3,691,366 A | * | 9/1972 | Spreuer | 362/253 |
| 3,819,206 A | | 6/1974 | Aarons et al. | |
| 4,088,857 A | * | 5/1978 | McCoige | 200/61.88 |
| 4,270,115 A | * | 5/1981 | Bonnett | 340/431 |
| 4,447,800 A | * | 5/1984 | Kasuya et al. | 340/904 |
| 4,591,954 A | * | 5/1986 | Kawamura et al. | 362/503 |
| 4,800,471 A | * | 1/1989 | Lippert | 362/505 |
| 4,808,968 A | * | 2/1989 | Caine | 340/479 |
| 4,846,697 A | * | 7/1989 | Rodgers | 439/35 |
| 4,949,228 A | * | 8/1990 | Lin et al. | 362/540 |
| 5,062,027 A | * | 10/1991 | Machida et al. | 362/541 |
| 5,134,385 A | * | 7/1992 | Coleman | 340/473 |
| D338,861 S | | 8/1993 | Lataster | |

(Continued)

FOREIGN PATENT DOCUMENTS

WO    WO 00/15975 A1    3/2000

*Primary Examiner*—Ismael Negron
(74) *Attorney, Agent, or Firm*—Birch, Stewart, Kolasch & Birch, LLP (57) ABSTRACT

A full functioning safety light bar and signal assembly for attachment to a vehicle hitch has a light system that uses a wiring harness assembly having one or more of the following lights: driving, brake/signal, flasher/emergency, reverse, marker, strobe, fog or illuminating lights. Electric sensors in the body of the light bar unit control strobe and illuminating lights. The assembly may match differently sized vehicle bumpers. Extension bars with light fixture assemblies can be attached to the light bar units to add greater illumination upon backing of the vehicle, and collars or strips of friction reducing materials may be attached on the hitch components to reduce vibration or noise. Locked protective covers are used to keep lights or lens in the light bar units from becoming scratched or damaged. Lockable security compartments are provided in the safety light bar to store items such as spare keys.

35 Claims, 5 Drawing Sheets

U.S. PATENT DOCUMENTS

| | | | |
|---|---|---|---|
| 5,424,715 A * | 6/1995 | Lietzow et al. ........... 340/539.1 |
| 5,434,758 A * | 7/1995 | Zeidler ....................... 362/496 |
| 5,514,009 A * | 5/1996 | Hughes ......................... 439/35 |
| 5,603,178 A | 2/1997 | Morrison |
| 5,829,774 A | 11/1998 | Klemp |
| 5,979,094 A | 11/1999 | Brafford, Jr. |
| 6,007,033 A | 12/1999 | Casson et al. |
| 6,015,223 A | 1/2000 | Kidd et al. |
| 6,053,627 A | 4/2000 | Vo et al. |
| 6,079,136 A | 6/2000 | Kozlarek |
| 6,097,283 A * | 8/2000 | Szudarek et al. ........... 340/431 |
| 6,140,919 A * | 10/2000 | Buchanan ................... 340/468 |
| D437,431 S | 2/2001 | Crouse et al. |
| 6,250,788 B1 * | 6/2001 | Muller ....................... 362/541 |
| 6,302,567 B1 | 10/2001 | Gamble, Sr. |
| 6,357,899 B1 | 3/2002 | Craven |
| 6,371,636 B1 * | 4/2002 | Wesson ...................... 362/545 |
| 6,379,028 B1 * | 4/2002 | Crouse et al. ............... 362/485 |
| 6,409,367 B1 | 6/2002 | Pratt |
| 6,412,202 B1 | 7/2002 | Oswood |
| 6,413,101 B2 | 7/2002 | Divoll et al. |
| 6,418,650 B1 | 7/2002 | Krewald |
| 6,491,315 B2 * | 12/2002 | Hagen et al. ............. 280/164.1 |
| 6,553,697 B1 | 4/2003 | Pichan |
| 6,623,151 B2 | 9/2003 | Pederson |
| 6,643,963 B2 | 11/2003 | Beller |
| 6,655,822 B1 | 12/2003 | Sylvester |
| 6,883,945 B1 * | 4/2005 | Gonzalez .................... 362/485 |
| 2002/0079669 A1 * | 6/2002 | Hagen et al. ............ 280/164.1 |
| 2002/0180597 A1 * | 12/2002 | Flick .......................... 340/436 |
| 2003/0011164 A1 | 1/2003 | Cipolla |
| 2003/0172498 A1 | 9/2003 | Polzin et al. |
| 2004/0040351 A1 * | 3/2004 | Alcott ........................... 70/63 |
| 2004/0156205 A1 * | 8/2004 | Pisciotti ..................... 362/485 |

* cited by examiner

SAFETY LIGHT BAR WITH A LIGHT FIXTURE ASSEMBLY

CROSS-REFERENCE TO RELATED APPLICATIONS

This application claims priority under 35 U.S.C. §119(e) of provisional application No. 60/520,299, filed Nov. 17, 2003, the entire contents of which are hereby incorporated by reference.

BACKGROUND OF THE INVENTION

1. Field of the Invention

The present invention relates to a safety light bar signal and assembly (light bar unit) that is an advancement in the devices that are connected into existing vehicle trailer hitches. The new system contains an integrated wiring harness assembly and connectors that operate a full functioning light bar unit. The present invention also includes a method of installing the new system on a variety of existing vehicle bumpers and hitch assemblies with the use of an expanding light bar housing capable of being sized for a variety of applications.

2. Description of the Background Art

The background art illustrates a variety of trailer hitch lighting systems and decorative devices. The light bar safety and signal assembly and method of the present invention builds and improves upon on the attempts of the background art by utilizing fabricated full functioning lights instead of relying just on the brake and signal lights. The safety bar equips the vehicle with an integrated light system that utilizes a wiring harness assembly that may contain driving, brake/signal, flasher/emergency, back-up, strobe, marker, fog and illuminating lights. The present inventor has also determined that there are numerous shortcomings with the previous attempts of the background art that are overcome by the present invention.

U.S. Pat. No. Des. 338,861 by Lataster shows a light shell bumper attached to a decorative cover for a vehicle trailer hitch tube. U.S. Pat. No. 3,819,206 to Aarons describes a cushion hitch made of toroids (hard elastomeric solid cast urethane) that function as both a spring and a shock absorber (but not vibration control) and other parts made of metal. Because of a close fit of the tube and pin, these components are coated with a material that has a low coefficient of friction such as polytetrafluorethylene. These components also fail to provide ease of attachment.

U.S. Pat. No. Des. 437,431S Crouse et al. is a design patent for a light weight trailer hitch cover that consists of a basic shell that is illuminated.

U.S. Pat. No. 5,603,178 to Morrison provides protection of weather and a decorative cover for the trailer hitch and a description of a way to secure the unit to the hitch on the vehicle.

U.S. Pat. No. 5,979,094 to Bradford, Jr. describes a lighted sign and protected trailer hitch accessory that uses signal lights, brake lights and harness assembly that hooks-up to a trailer hitch. The Brafford patent differs in that the main objective is a lighted display sign that uses light bulbs for sign viewing. It provides a protective cover that prevents damage by weather and exposure.

U.S. Pat. No. 6,007,033 to Casson et al. describes a placard or brake light installed into the hitch. U.S. Pat. No. 6,053,627 to Vo describes a cover that blocks the hitching socket from view in a decorative manner. U.S. Pat. No. 6,079,136 Kozlarek relates to a display that employs a message systems. The signal and brake lights are small and are housed inside the display unit. The signals are located behind the message display and this limits the illumination for the signal.

U.S. Pat. No. 5,829,774 to Klemp describes a bumper with signaling brake lights that are housed in the same unit. Klemp does not have the ability to have a usable step bumper. U.S. Pat. No. 6,015,223 to Kidd and Filbrun describes a light carrier with light emitting diodes in a lens carrier that is meant to be seen when other brake lights are obscured to following vehicles that are behind.

U.S. Pat. No. 6,302,567B1 to Gamble describes a removable and vertically adjustable warning light attached into the hitch to warn other vehicles. U.S. Pat. No. 6,140,919 to Buchanan shows an auxiliary signal light system's enhancements that are arranged in a radial fashion. The signal lights are housed in the arms and brake light attachments in the well of the housing. The turning signals are formed in the surface of the arms.

U.S. Pat. No. 6,357,899 to Craven describes a type of trailer hitch cover with a decorative logo on a lens face. U.S. Pat. No. 6,379,028B1 to Crouse refers to plastic light partial shell assembly with clear lenses adapted to receive various indicia for illumination beyond the rear of the vehicle that provides supplemental back-up lighting.

U.S. Pat. No. 6,412,202B1 to Oswood describes a signage patent for messages with clips on the tongue. U.S. Pat. No. 6,413,101 to Divoll describes a power outlet adapter that lacks being placed on a light bar. U.S. Pat. No. D437,431S to Crouse covers design patterns for the partial shells assembly.

U.S. Pat. No. 6,491,315 to Hagen describes a brake warning and step for a bumper and a warning brake light and signal light. U.S. Pat. No. 6,553,697B1 to Pichan describes a lighted sign having readily attachable/detachable display panels. Inside this housing are signal and brake lights. U.S. Patent No. 2003/0011164 A1 to Cipolla describes a metal collar configured to the same shape as the squared male joining member of the hitch. The collar was used to quite vibrations from the hitch coupling by mechanically tightening the collar. Plastic is used to coat the metal collar so that the hitch would not be unnecessarily scraped up while in use.

U.S. Pat. No. WO 000/15975 to Daudi describes a viscoelastic adhesive bonded to an intermediate element reducing vibration and noise on the friction rings consisting of "any adhesive having viscous properties and elastic properties and having a greater tendency for reducing the transmission of vibrations." Silicone is the preferable adhesive. The adhesive with intermediate laminate metal such as steel or a laminate fiber reinforced with plastic is used for the element to reduce vibration or noise. In contrast, the plastic in the present invention is a flexible solid, e.g., not like the Daudi patent of viscous silicon that become non-flexible when used with metals and incorporated in layers that become more rigid.

U.S. Patent No. 2003/0172498 to Polzin et al. describes a cushion made of polymers that have a new layer of foam or foaming materials that accomplish vibration damping to a user. This varies from the slidable non-friction material of this patent by utilizing a foaming or foam agent to produce honeycomb cells compressing under a users grip for cushioning purposes. The entirety of each of the aforementioned U.S. patent Documents is hereby incorporated by reference.

SUMMARY OF THE INVENTION

The present inventor has determined that the previous systems lack a full functioning wiring harness equipped with driving, back-up, marker, signaling, brakes, signals, hazard, strobe, marker, fog and illuminating lights. The light bar unit of the present invention has the option of add-ons such as extension bars equipped with lights, lockable protective covers, protection coatings or external electrical plug-in sockets. The ability to store that "extra set of keys" in a hide-way lockable compartment is another safety feature. The plastics in the collars or strips are used to facilitate the telescoping ability of the couplings. The collars or strips possess the ability to lower the noise or vibration level on the interior of the female coupling, on the male coupling, other positions on the couplings or orifices.

The safety bar equips the vehicle with an integrated light system that utilizes a harness assembly that contains driving, brake/signal, flasher/emergency, back-up, strobe, marker, fog and/or illuminating lights. The wiring harness assembly is equipped to use the most common standard flat 4-way plug or a combination plug system made to conform to an individual light bar unit. The wiring harness assembly contains the same number of wires and the placement of these wires matches the number of light fixture units in a light bar unit. The present invention relates to a light bar unit that encompasses the entire width of the vehicle and is connected beneath their existing bumpers. Vehicles and their respective bumpers vary in size and width and depth. The present invention varies in size and width to compliment the bumpers.

The National Highway Traffic Safety Administration states that millions of traffic accidents can be reduced by half by introducing supplementary lighting on the rear portion of vehicles. This novel light bar unit provides a method and the means to enhance safety, by utilizing the light bar units functions, giving greater visibility while driving or at rest. A traffic accident may involve vehicles running or parking in the dark, dim, dusky, foggy or even daytime lighting. Incorrectly judging the distance, the operator does not estimate the distance the vehicles are apart. The use of trucks has increased the number of trailers to pull such items as: snowmobiles, boats, camping equipment, pop-up tents, motorcycles and horse trailers. Most vehicles are purchased with hitches that are located under the bumper and others are installed with after-market hitches.

The present invention overcomes the shortcomings associated with the background art and achieves other advantages not realized by the background art.

An object of the present invention is to provide a novel safety light bar signal combination (light bar unit) and method that has many advantages over the background art.

Most vehicles are now purchased with hitches. Many other vehicles have after-market hitches installed because of the expanded market for trailers, boats, and numerous other items being towed on today's highways.

For vehicles especially those currently operating on the highways and roads, the device provides a method to enhance safety. The advantages in safety are significant in that added light gives the operator greater visibility that is highly desirable. By utilizing the light bar lens assembly that functionally gives a vehicle greater visibility it enhances safety while driving or at rest.

The ability to connect your trailer system above the light bar unit has another feature that benefits the vehicle owner. It keeps the wires and the electrical connectors running between the vehicle and the light bar unit in the shortest possible length for purposes of safety and convenience. The wiring harness assembly exits the rear of a vehicle and then the end of the electrical plug-in socket can be hooked up to the hitches electrical connections. Another way to hook up exterior elements is to duplicate the electrical plug-in sockets and have two separate wiring units running between the vehicle and the trailer system. It becomes clumsy and disorganized and must be removed when the extra wiring for the trailer is not in use. This causes the owner to remove the extra electrical plug-in sockets numerous times if the owner plans to utilize the vehicle and trailer system.

The present inventor has determined that there is a need for a device that can be used for a light bar unit that can accommodate lower profile vehicles. The back plate is positioned and attached centrally or offset to the light bar housing either on the upper section or on the lower section of the light bar housing. When attaching the light bar housing to a vehicle, it can be inverted with the offset placement of the back plate. This allows the light bar unit to have a lower profile under the lower profile vehicle bumper. The lower position enables the light bar unit to clear obstacles such as license plates, bumpers and exhaust pipes. In many cases, the vehicle would not otherwise have been able to accommodate the light bar unit. The light bar unit can also be attached or mounted to other vehicles, trailers, off road farm vehicles or farm equipment. The method for attaching or mounting the light bar includes bolts, screws or hooks and other normal attaching or mounting means and materials. The mounting hardware can be attached to any surface (front side, backside or two side surfaces) of the light bar unit to accomplish the mounting process.

The ability to connect an additional trailer system into the light bar unit is another feature that benefits the vehicle owner. Keeping the wires and the electrical plug-in sockets running between the vehicle and a trailer organized and compact adds safety and convenience.

Trailers and other towable apparatus that are inserted into hitches have undesirable side effects of vibrations, rattles and noise when towed. Collars/strips attached to the light bar unit help limit vibrations or noise of the coupling or openings. By keeping distractions to a minimum for operators, the vehicle's safety is enhanced. Collars/strips of friction reducing materials are attached onto the hitch components, e.g., the exterior of the male tongue insert (located on the light bars) or the interior cavities of the female receiving socket (located on vehicles).

Protective covers are produced for the light bar units and comprises from various lightweight or ridged materials that can be used to produce the protective cover. The cover protects the light bar unit from various types of damage. Conventional or flexible materials that can fit snugly over the light bar unit form a cover for protection from dust or dirt and the protective cover is lockable to prevent vandalism or theft.

One or more of these and other objects is accomplished by a safety light bar capable of being inserted into a mounting hitch comprising a light bar housing having peripheral walls including a top and bottom surface, a vertical side surface and an opposing side surface that collectively form a cavity inside the light bar housing; a light fixture assembly mounted within the light bar housing; a fastening device for affixing the light bar housing to a mounting surface; and an electric plug connector connecting the light fixture assembly mounted into the light bar housing to a power source.

The aforementioned safety light bar may also be arranged to include a light bar housing that is substantially rectangular-shaped, square-shaped or oval-shaped in cross section.

The safety light bar may be formed from a lightweight material selected from a group consisting of aluminum, stainless steel, ferrous steel, plastic, fiberglass, plated steel, extruded aluminum and chrome. The light bar housing may be capable of extending and contracting between a first fully extended position and a second fully compressed position. The light bar housing may be sized to operatively engage with a mounting hitch on at least one of a on-highway vehicle, a trailer, an all-terrain vehicle, a piece of off road farm equipment, or a piece of construction equipment. The fastening device may include mounting hardware for attaching the housing to the mounting hitch. The light bar housing may be provided with at least one finish selected from the group consisting of bright anodized finish, chrome plated finish, and wheel abraded finish. The light fixture assembly may also include a plurality of mounting flanges, a plurality of lighting fixtures, and a plurality of lens openings formed in the light bar housing for respectively accommodating the mounting flanges and the lighting fixtures. The lighting fixtures may also include a plurality of light emitting diode (LED) light sources mounted in the light fixture housing. Alternatively, and/or in conjunction with the aforementioned features, the lighting fixtures may include at least one of an automobile lamp, a halogen lamp, an incandescent bulb, and a strobe light; or white or multi-colored lights within the light fixture assembly.

The lighting fixtures may also include at least two or more lights selected from the group consisting of a light emitting diode (LED) light source, an automobile headlamp, a halogen lamp, an incandescent bulb, and a strobe light. The light bar housing may further comprise a reflective device having at least one reflective surface; and a fastening device for holding the at least one reflective surface within the light bar housing, e.g., such as a mirror or a reflector.

The safety light bar may also include a plurality of end caps secured within ends of the light bar housing. The safety light bar may also include a photo sensor assembly within the end caps or within the light bar housing. The safety light bar may also include a device for sensing low light, the device for sensing low light including at least one electrical sensor for automatically controlling illumination from the illumination fixtures based on the ambient light sensed by the device for sensing low light. The safety light bar may also include at least one electrical sensor for calculating a distance between the at least one electrical sensor and an object in the vicinity of the safety light bar. The safety light bar may also include at least one light fixture positioned to direct light downward and outward away from the light bar housing. The safety light bar may also include at least one sound mechanism within the light bar housing for providing a warning sound for a coordinated reverse operation with a light fixture providing a reverse light.

The electric plug connector may be formed as a part of a wiring harness assembly having a plurality of wires, the wiring harness assembly including at least two lights from the group consisting of brake signal lights, turning lights, driving lights, reverse lights, trailer signal lights, strobe lights, marker lights, and fog lights. Further, at least one of the end caps may include a lockable panel for providing a security compartment within the light bar housing.

One or more of these and other objects may also be accomplished by a safety light bar capable of being inserted into a mounting hitch comprising a mounting hitch; a light bar housing having peripheral walls including a top and bottom surface, a vertical side surface and an opposing side surface that collectively form a cavity inside the light bar housing; a light fixture assembly mounted within the light bar housing; a fastening device for affixing the light bar housing to a mounting surface; an electric plug connector connecting the light fixture assembly mounted into the light bar housing to a power source; a back plate being attached to the light bar housing; a male tongue insert forming a portion of the back plate and for attaching the back plate to the mounting hitch; and a female receiving socket within the mounting hitch for engaging the male tongue insert.

The aforementioned safety light bars may include a male tongue insert operatively secured with a female receiving socket by a coupling pin inserted through a pair of respective male and female coupling pin insertion holes. Further, at least one of the end caps may include a lockable panel for providing a security compartment within the light bar housing. The safety light bar may also include a locking device for securing the female receiving socket with the male tongue insert.

The embodiment described is not limited in its application to details of construction arrangement of components or illustrations and the drawings. The phrases and terminology employed herein, are for the purpose of description and should not be considered limiting. The conception, upon which this disclosure is based, should not be considered limiting for the design of other structures, methods and systems that are described herein. It is important for the claims being regarded to include equivalent constructions that do not depart from the spirit or limited in scope the nature and essence that is described herein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention.

DETAILED DESCRIPTION OF THE PREFERRED EMBODIMENTS

The present invention will hereinafter be described with reference to the accompanying drawings. In the drawings, the following reference numerals have been designated to identify their respective components. Specifically, Safety Light Bar Housing 10; Rectangular Lens Openings 20; Circular Lens Openings 30; Rectangular Mounting Flange 40; Circular Mounting Flange 50; Rectangular Lens and Lighting Fixture 60; Circular Lens and Lighting Fixture 70; Side End Caps 80; External Electrical Plug-In Socket 90; Back Plate Mounting Hole 100; Male Tongue Insert 110; Female Receiving Socket 120; Pin Insertion Holes 130; Back Plate 140; Complete Light Fixture Assembly Unit 150 (having elements 60,70,160,270 & 40,50 encircling the unit); Generic Automobile Type Light 160; Wiring Harness Assembly 170; Plug Connectors 180; Wire Leads 190; Coupling Pin 200; Collar/Strips 210; Drain Hole 220; Bumper 230; Extension Bar 240; Protective Cover 250; Complete Light Bar Unit 260; Strobe Lights 270; Electric Sensors 280; Wire Plug Connector Adapter For Multi-Lead Plug Ends 290; Alignment Guide 300; Sleeve 310; and Security Compartment 320.

Figures 1, 2, 3:
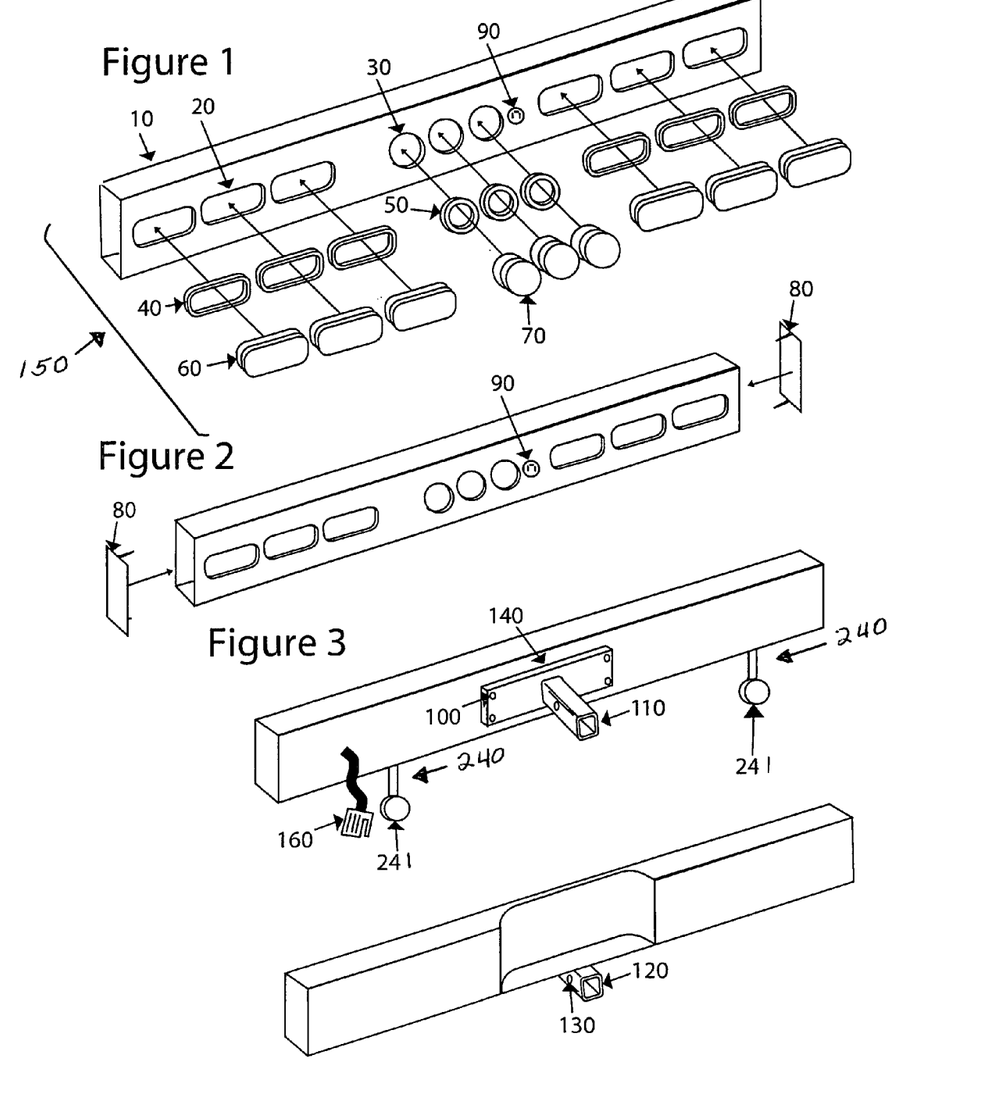
FIG. 1 shows an exploded view or assembly drawing of a light bar in this present invention.
FIG. 2 shows an exploded view of the light bar assembly with end caps off in this present invention.
FIG. 3 shows a rearward view of the light bar assembly and a female receiving socket located underneath a bumper.

FIG. 1 is an exploded view of the light bar housing 10 with openings 20 & 30 of a size and configuration to match a mounting flange 40 & 50 that encircles the lighting housing. The complete light fixture unit 150 is comprised of a lens and lighting fixture 60 & 70. Contained within the fixture 60 & 70 is a mixture of lights such as generic automobile lights 160, other lighting 270 or other types of lighting such as LED. The light bar housing 10 is comprised of a peripheral wall defining a top and bottom surface, having a vertical side and an opposing side that forms a cavity inside the housing of the light bar 10. The light bar housing 10 contains a hollow interior cavity that can be constructed, fabricated or extruded from aluminum, stainless steel, plastics or other light weight materials or compounds or other suitable materials that can be used to form the housing. Numerous finishes for the light bar housing 10 such as bright anodized finishes could be utilized. Referring to FIG. 1, it shows an exploded drawing of the frontal view of the light bar housing 10.

The shapes for the light bar housing 10 would be substantially rectangular, box, squared or tube/pipe like shapes for the main body of the light bar housing 10. The shapes can be oval, elongated, rounded, expanded or compressed to produce suitable changes in the shape of the light bar units 10. The shape of the light bar housing 10 can be formed to conform to the vehicle bodies exterior rearward visual lines.

Referring to FIG. 2, the end caps 80 are fitted into or onto the ends of the main light bar housing 10. The end caps 80 are formed into suitable configurations by changing their shapes to become slanted, squared, pinched, semicircular, oval, rounded, open or any other shape. The light bar assembly end caps 80 are composed of various materials including; aluminum, steel, stainless steel, plated steel, fiberglass, plastics, extruded aluminum, chrome, light weight materials or compounds such as polypropylene or polyethylene, polymer compounds or any combination of light weight materials or compounds or other suitable materials. These materials can match the hollow body 10. Substances comprised of Plexiglas®, fiberglass, glass, thin film, rubber, vinyl, lens materials may also be used. Other combination materials that do not match the hollow body materials can be inserted to form the end caps 80.

Figure 8:
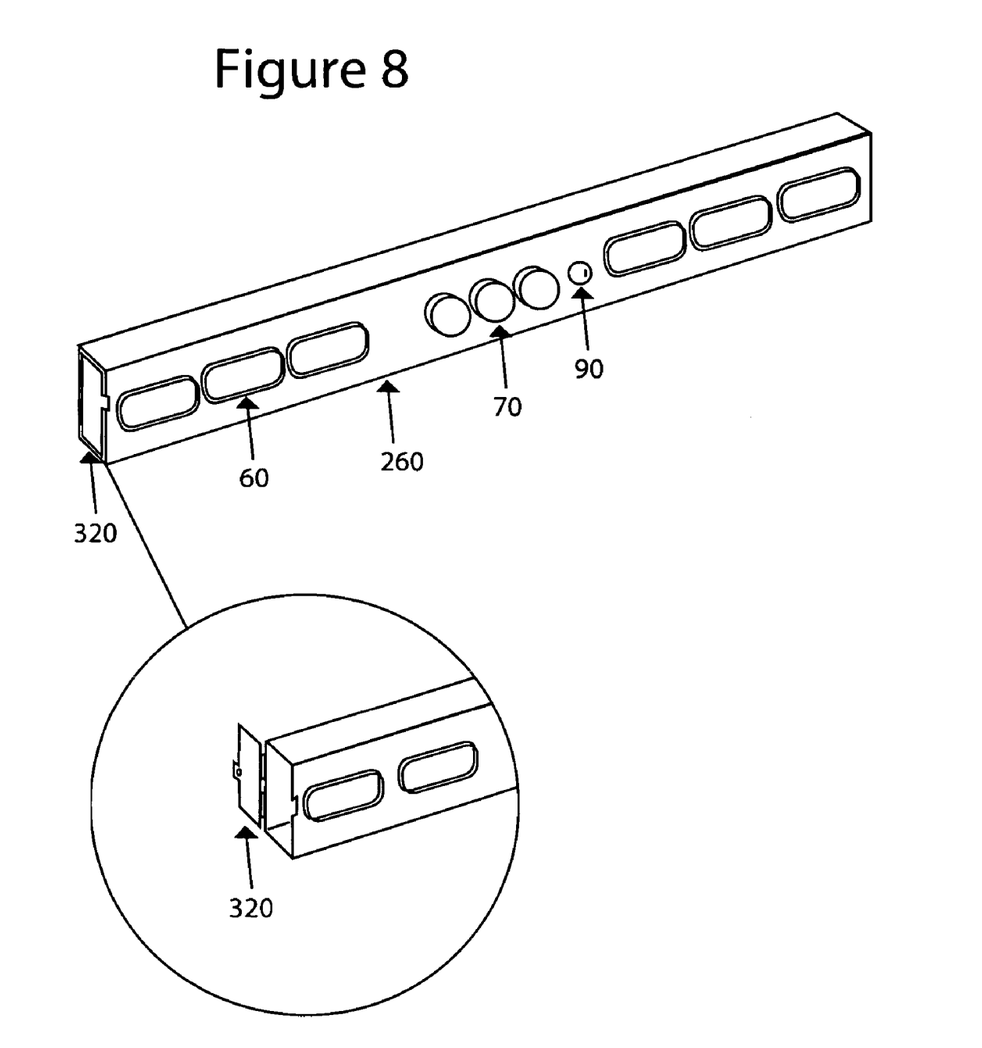
FIG. 8 is a view of the light bar unit showing one example of a compartment located in the end cap not the only shape or position for the compartment.

As seen in FIG. 8, compartments 320 for keys or small or large products that could be determined useful such as poles or aesthetically pleasing items are located onto or into the light bar housing 10 or side end caps 80. Optional add-on items like locks, small usable or helpful items like openers or the like can be applied to the compartments. The storage compartment 320 area includes a peripheral wall having a top surface, bottom surface, a vertical side surface, opposing side surfaces, optional back end wall surfaces and an optional door that forms the compartment 320. The compartment 320 is located on the exterior of the said light bar unit 260 or interior recessed into the said light bar housing 10 and a mounting flange 50 & 40, gasket, welding, sealant, or other suitable means are used for attaching and sealing the compartment 320 onto or into the light bar housing 10. A compartment 320 can be created by constructing an exterior compartment with an interior opening with an optional attached door, placing it onto the light bar unit 260, a compartment can be constructed within the light bar housing 10 with an optional attached door: an optional door for a drawer 320 that opens or slides outward or inward, an optional door for a drawer 320 opening or sliding on the bottom, top or sides, end caps 80 acting as an optional door opening or sliding on the bottom, sides, top or a side door opening or sliding from the vertical sides.

The drawer's 320 interior compartment (drawer) 320 can be attached to the light bar unit 260 on the exterior or constructed into the interior of the light bar housing 10 exposing the entire internal area of the light bar unit's housing 10 or exposing smaller or larger interior compartments located on both ends, on just one end or on ends with optional doors. Attaching devices such as hinges, magnetic fasteners, hooks, straps, adhesives or any other suitable fasteners can be applied for securing the compartment 320. An optional locking mechanism for the door on the drawer can also be provided for securing the compartment 320.

The end caps 80 can be locked into place, force-fit, bolted or screwed. A gasket or mounting flange 40 & 50 that can be cammed apart for installation also can be used. Similarly sealants, plastics, welding or other means to attach the end caps 80 to the body of the light bar 10 can be utilized.

The openings 20 & 30 on the housing 10 are constructed or formed to be contained within the configuration of the light bar housing 10. The openings 20 & 30 can be produced with numerous methods such as CNC machines, routers, plasma cutters or with any other suitable methods. The openings 20 & 30 are prepared to match the configuration of the mounting flange 40 & 50 that may include any flexible or formable materials such as rubber, plastic, vinyl, composite materials or other suitable materials that can be installed to form the seal. The mounting flange 40 & 50 conforms to the shape of the opening within the housing 10 that will receive the same configuration of the complete lens assembly unit 150.

Complete light fixture assembly unit 150; may contain sealed lights fixtures, snap-in sealed light fixtures or light bulbs 160 with transparent lenses that possess the ability for the passage of light are placed, force-fitted or cammed into or onto the mounting flange 40 & 50. Suitable attaching devices such as screwing, welding, bolting or any other known attaching devices or fasteners within the art. The lenses 60 can be produced from a variety of shapes, sizes, textures, patterns, colors, materials and other transparent or translucent materials. The light fixtures θ may include fiber optic, LED, incandescent, automobile lamps, strobe or other types of lighting that can be used for the complete light fixture assembly unit 150. A reflector assembly (not shown) for the transmission of light can also be added. The reflector assembly can be parabolic-shaped or other shapes. The light may be reflective or refracted by facets on the lens surfaces or the lens may have a plain surface. The lighting obtains greater visibility when the light passes through facets in raised portions of the lens. The raised facets do not allow the light to be concentrated thereby diffusing the light.

Strobe lights 270 may be inserted in end caps 80 or the housing of the main light bar 10. By placing electric sensors 280 in the body of the light bar 10 it senses objects behind the vehicle and sound mechanisms such as beeping to warn those behind the light bar unit while in the process of backing up. The light bar unit 260 with electric sensors 280 included in the body of the light bar 10 has the option to activate strobe lights 270. With the addition of an electric sensor 280 used as a daylight sensor the lights can be automatically controlled based on the ambient light. Back-up lights 160 have clear or white lenses but any color allowable can be used. The lights can be placed internally in the main housing of the light bar 10. They also can be placed on the external top, bottom or side surfaces of the light bar unit or on any extension added on to it.

Other lighting types can be positioned into the entire light bar unit 260. Bright illuminating lights 160 attached to a sensor 280 and positioned in the light bar unit 260 increases vision when outside light is decreased at dusk or nighttime. Aiming and placement of such lights 160 requires that the lighting rays do not interfere with those near or far. An arc of illuminating light can be directed through the lens or light fixture assembly 150 that are reflected downward in an arc of light to effectively illuminate pavement. Lights 160 are set at predetermined outwardly and downwardly angles. For example, a predetermined light streaming outwardly and down at a 45 degree angle illuminates the pavement or street under the light bar 260. Other angles and placements can be used. The illumination lights 160 contain clear, white or colored lens or lights or any suitable replacements could be used.

Extension bars 240 can be attached on to the light bar housing 10 and lens units 60 and 70 or a lens/light fixture assembly/unity 241 can sit on the end of the extension bar 240. Mounting flanges (not shown) are attached to the lens/light fixture assemblies/units 241 in the same manner that they are mounted into or onto the light bar housing units 10. The extension bar 240 can be welded bolted or utilize alternative fasteners for attaching the extension bars 240 to the light bar main body housing 10. The lens/light fixture assemblies/units 241 are attached or mounted to the extension bar 240 with any suitable materials, means or methods used to construct the extension bars 240.

Any rigid and durable materials such as aluminum, Plexiglas®, plastics or various suitable materials of various colors or with indicia are used in conjunction with each other or with any suitable materials, means or methods. Flexible materials allow the extension bar 240 to move or sway instead of breaking or becoming unattached. Rubber or other suitable materials are used in conjunction with each other or singularly with any suitable materials, means or methods in conjunction with each other.

The complete lens assembly unit 60,70,320 is inserted into a mounting flange 40 & 50 by camming the mounting flange 40 & 50 into the opening in the hollow light bar housing 10. This mounting flange 40 & 50 seals the light fixture unit 150 to the light bar housing 10.

Figure 6:
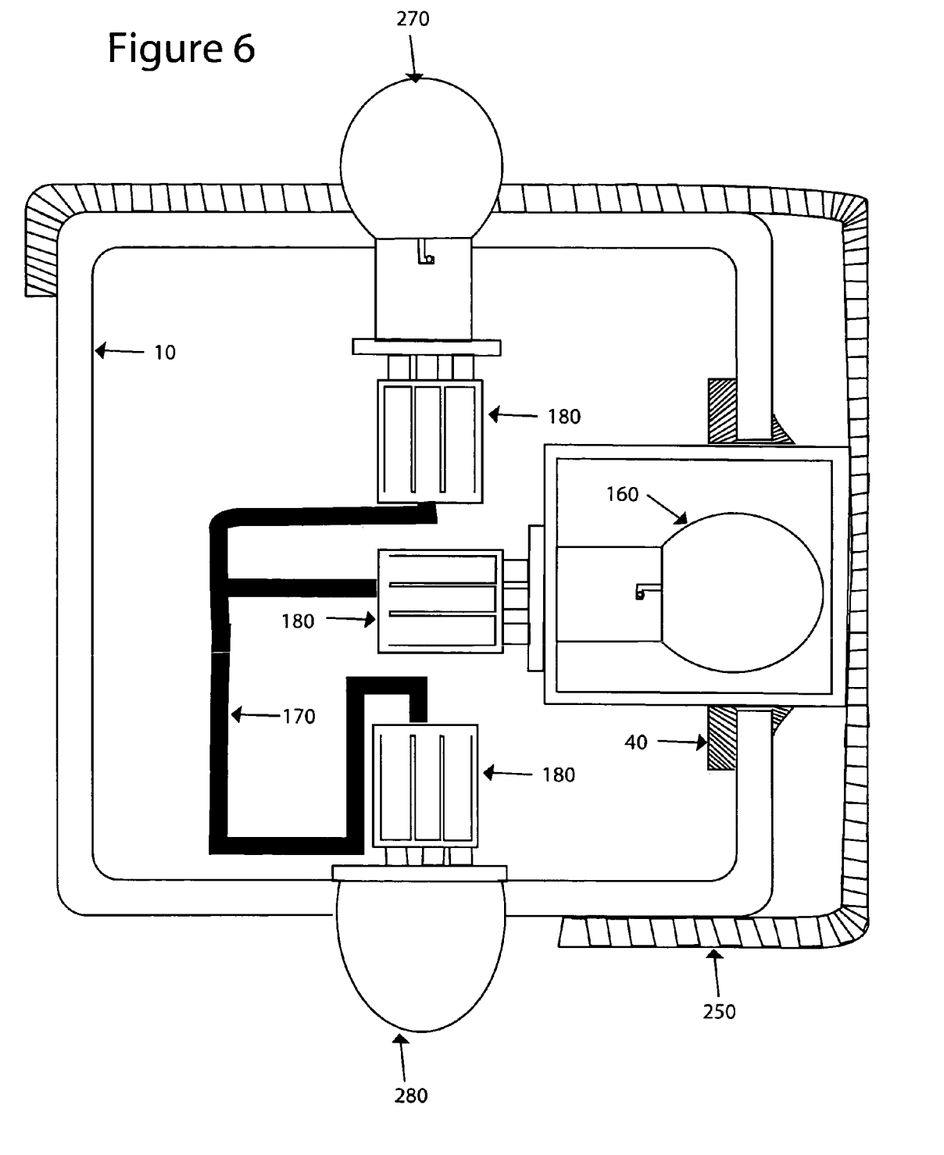
FIG. 6 shows a cutaway or sectional side view of the light bar assembly with end caps removed showing the complete lens assembly unit including rearward attachment of the wire leads, generic automobile type light, strobe light, electric sensor, mounting flange and protective cover.
Figure 7:
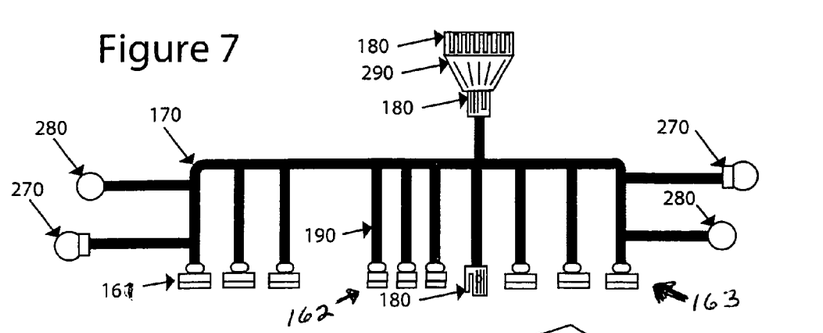
FIG. 7 is a view of the complete wiring harness assembly including an adapter to connect a standard 4 wire connection to a 8 wire connection and included in the wiring harness wire leads, end plugs, external electrical plug, complete light fixtures assembly (mounting flange not shown), strobe lights and electrical sensors.

FIG. 6 illustrates a cutaway of the mounting flange 40 & 50, the complete lens assembly units 150, wiring harness assembly 170 and plug connectors 180 housed in the light bar housing 10. The lens/light assembly 150 is connected to the plug connectors 180 attached in any suitable manner and electrical wire lead 190 from each of the electric lens/lights assembly 150 is passed through the wiring harness assembly 170 is energized continuously when the vehicle ignition system is in the ON state and attached to the vehicle battery that is supplying current. The wiring harness assembly 170 controls the lens/light assembly 150 in the normal operating manner.

Referring to FIG. 2. the light bar assembly end caps 80 are composed of various materials including aluminum, plastics, chrome or other suitable materials that best suit the light bar unit 260 specifications. End caps 80 can be comprised of the same materials that match the light bar housing 10 or other substances such as Plexiglas, lens, rubber or other materials that are suitable for use in manufacturing the light bar unit 260.

Referring to FIGS. 1. & 2. the trailer hitch electrical plug-in socket 90 provides electrical power for an external hook up for trailer lights that are positioned on the rearward location on a trailer. The external electrical socket 90 provides a power connection for utilization. This gives owners of vehicles with dual receiving hitches the outlet needed to attach extra lights or other electrical products.

FIG. 3 refers to the rearward view of the light bar assembly 10 that shows the male tongue insert 110 that is inserted into a vehicle that has a female receiving socket 120 on the vehicle. Plastic attaching or surrounding the male tongue insert 110 can help the telescoping into/out of the female receiving socket 120. An alignment guide 300 is attached to the male tongue insert 110 to position the insert into the female receiving socket 120 at the correct depth for the operator to use securing means. The guide 300 positions the insert to align up to the correct pin insertion hole 130. The male insert 110 normally provides the operator with numerous pin insertion holes 130 for telescoping in and out for securing the male insert 110 at the correct depth. The process correlates to differing hole patterns due to different vehicle models hole positions, size and profile to the bumper. The guide 300 can also serve dual purposes for protection and cushioning the light bar unit 10 and the hitch from nicks during the insertion process. The guide 300 can be formed from a variety of materials to suit the properties that comprise both the light bar unit 10 and hitch. Hardened plastics, steel, rubber or other suitable materials or compounds could be utilized. The means for securing the male and female inserts 110 & 120 is accomplished by inserting a locked or unlocked coupling pin 200 through the pin insertion holes 130. The securing of the two pieces can be accomplished by other common means to connect them.

Hitches are produced in numerous sizes for vehicles and marketed by class sizes II (1.25 inches) or III (2 inch) or other Classes for industry are standard. To make the male insert 110 compatible for the different classes a sleeve 310 can be constructed to fit over the male tongue insert 310 shaft portion to accommodate the different sizes. Sleeves 310 made of materials such as aluminum, steel, plastic or rubber materials, polymer compounds or polymeric materials or the like. The sleeve 310 can also serve a dual purpose being modified to fit two or more female receiver hitches 120 furthermore reducing noise, vibrations, rattles and movements. The sleeve 310 for class II comprise of a rectangular tube approximately the same (but slightly larger than the male) configuration as the male tongue insert 110 from the back plate 140 to the alignment guide 300 ability to cover or secure to a bore of 1.25 inches square. A class III sleeve 310 comprises a rectangular tube approximately the same but slightly larger than the male configuration as the male tongue insert 110 from the back plate 140 to the alignment guide 300 and the ability to cover or secure the bore of 2.00 inches square. The means for securing is accomplished by inserting the male tongue insert 110 into or onto the sleeve 310 and bolted, glued or other suitable means for securing. Mounting holes 100 can be drilled or otherwise inserted into the sleeve 310 and the male tongue insert 110. The securing of the two pieces can be accomplished using connecting pins 130 to connect them.

Collars/strips 210 of friction reducing materials or coating materials with friction reducing qualities are attached by adhesives or other means on the interior light bar housing 10 on the exterior of the male tongue insert 110 or on the interior of the female receiving socket 120 to help limit vibration or noise. Collars/strips 210 can be produced in different ways. First, the collars/strips 210 can be produced by ringing the outer periphery of the male tongue insert 110 collars/strips 210 to facilitate its insertion into the female receiving socket 120, and to keep the vibrations and noise of the couplings 110 & 120 to a minimum. The collars/strips 210 can be produced by placing the collars/strips 210 of friction reducing strips materials on the opposing lateral sides such as the top and bottom or on other vertical sides of the male tongue insert and the interior of the female receiving socket 110 & 120 which helps to keep the vibrations and noise of the couplings 110 & 120 to a minimum. The collars/strips 210 can also be used on any parts of male and female hitch couplings 110 & 120 combinations. The placement of the collars/strips 210 in various combinations accomplishes the purpose of the collar 210. The collars/strips 210 can be made of materials such as nylons, plastics or other friction reducing and wear resistant substrates. A collars/strips 210 of friction reducing strips can also be made by placing the materials on the opposing lateral sides such as the top and bottom or the opposing vertical sides. Any combination of the side placements still accomplishes the purpose of the collars/strips 210. The back plate 140 is attached to the light bar housing 10 aligning the hole patterns 100 and attaching them. Bolts are used as a means of connecting the mounting holes 100 on the back plate 140 to the light bar housing 10 or screwing or welding can be used or other suitable conventional means.

The back plate 140 is positioned and attached centrally or offset to the light bar housing 10 either on the upper section or on the lower section of the light bar housing 10. When attaching the light bar housing 10 to a vehicle it can be inverted with the offset placement of the back plate 140 that is joined to the light bar housing 10. This allows the unit 10 to have a lower profile under the vehicle bumper 230. The light bar unit 260 can also be attached or mounted to other vehicles such as trailers, off road farm vehicles, farm equipment, construction equipment or other suitable placements. Suitable means for securing and attaching the light bar unit 260 includes hangers, clamps, magnetized bars or other suitable means known within the art 10. The same methods and means are used for the attaching or mounting the parts of the light bar housing 10 such as back plate 140, extension bars 240 or other parts of the invention.

Figure 4:
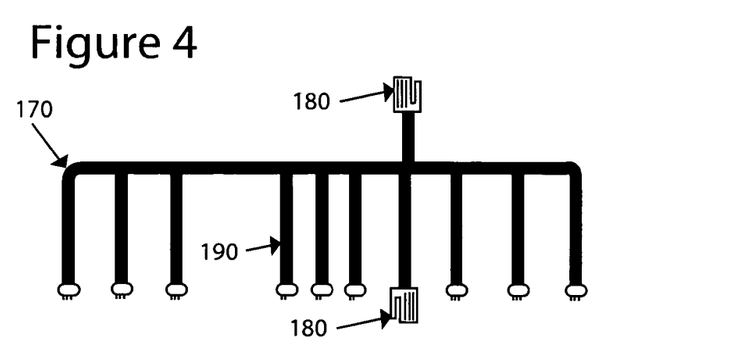
FIG. 4 is a schematic view of the wiring harness assembly that is an integral part of the present invention.

FIG. 4 refers to the wiring harness assembly 170 that is created for each light bar housing 10. Combinations of full functioning wiring harness assemblies 170 are produced for each light fixture unit 150 contained in a light bar housing 10. A full functioning wiring harness assembly 170 includes correlating the same number of openings 20 & 30 in the light bar housing 10 and the same number of wire leads 190 to be connected. The wires leads 190, plugs 160 or any other parts in the wiring harness 170 can be color coded to facilitate the ability to see and locate parts for fast and easy construction of the wiring harness 170. An adapter 290 can be used to connect a conventional plug connector 160 with fewer wires 190 and attaching another plug connector 160 with numerous wires 190.

A plug connector 160 with numerous wires 190 connecting to an adapter to attach a plug connector 160 with wires 190 not equal in number. The adapter 290 allows the wiring harness to be used with numerous harness with differing number of wires 190.

The wire leads 190 are laid out flat with the individual end plug connectors 160. The wire leads 190 are installed into the plug connectors 160 which are then installed and bundled into a unit wiring harness assembly 170. Tape is then wrapped around the wires or a resin is then poured over to cover the wires 190 and form the wiring harness assembly 170. The wires 190 could also have a braided fabric wrapped around the wires 190 that shrink under applied heat or other standard means can be used. The harness assembly wire 170 plug connector 160 is connected to the rearward portion of the sealed or unsealed lens/light fixture 150.

FIG. 1 illustrates one version of the light bar unit 260 including nine independent lens units 40 & 50 inserted into the rectangular and circular punched out openings 20 & 30 in the unit body 10. By attaching different control leads to the complete lens/light units 150 they function in a variety of ways. The lighting units 150 are designed to be multifunctional; driving, brake/signal, flasher/emergency, back-up, strobe, marker, fog and illuminating lights or other vehicle or light function combinations. The wiring harness assembly 170 can be fabricated to produce various configurations for connecting the wiring harness assembly 170 to the light units 150. This allows for a variety of different combinations. The wires 190 in the harness assembly 170 control whether the lenses 40 & 50 are attached as follows in this example (but not limited to) left three red—signal/brake lights 161, middle three red—running/driving lights 162, right three red signal/brake lights 163. The complete light fixture assembly units 150 in this example would be all right 3 lights for right signal, all left 3 lights for left signal, all lights for driving, all lights for flash and all lights if the hazard/warning lights are activated. The outer brake lights would blink bright when brake and signal lights are activated. A brighter light would be used for driving. A bright light would blink for the hazard signal.

Figure 5:
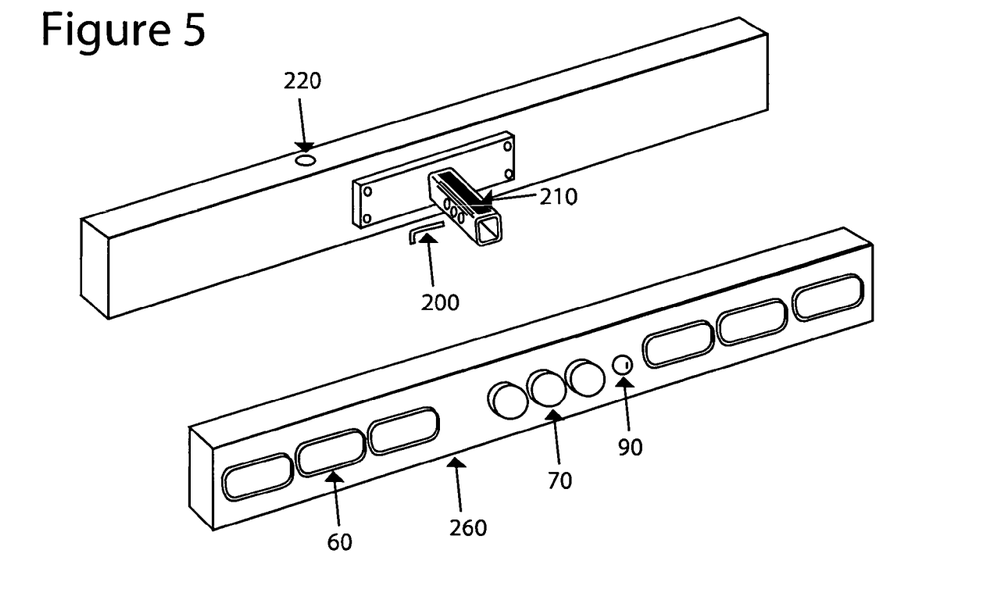
FIG. 5 is an inverted rearward view of a complete light bar assembly having a drain hole, back plate, male tongue insert, coupling pin collars/strips and a frontal view with the complete light fixtures assembly installed in the housing of the present invention.

FIG. 5. shows a light bar housing 10 suspended in the rearward position and connecting the male tongue insert 110 into the female receiving socket 120 located on a vehicle. A protective cover 250 for the light bar unit 260 can be produced to prevent damage to the lens/light fixture assembly 150 from damage or scratches when at rest or not in use. The negative environmental effects on metals and other materials that cause rust and the build up of dirt or grease are prevented by the protective covers 250 fashioned to compliment the shape of the light bar units 260. The protective cover 250 is constructed, fabricated or extruded from various lightweight materials such as extruded aluminum, stainless steel, plastic or other materials that form a protective usable cover 250.

Conventional flexible materials such as nylon, some plastic or composite materials that fit snugly over the light bar unit 260 or make a formable material such as foam may also be used. They form a cover 250 for protection from dust or dirt. Protective coating 250 of plastic film with additives such as UV sun light stabilizers or non-yellowing additives for weather resistant and abrasion resistant film are suitable for covers 250. Films that have agents added to help the film properties become stronger, lighter, clearer, non-stick or other helpful properties. Thermosetting polymers have the ability for no shrinkage and as it cures the coating 250 mechanically adheres to the metal or other material used in a light bar unit 260. Plastic film coating or covering materials with an adhesive layer sized, shaped, cut or die cutting methods can be used to produce an entire rear surface for the covering 250. Film can be cut or die cut with openings or can produce openings to matching up to the openings in said light bar unit 260. The plastic film coating or covering can be a nonstick cover 250 with a self-adhering cover 250 that is affixed to a release backing, liner or film. Plastic film material can be produced to secure and utilize an adhesive backing that can be formed from heat-activated adhesives.

Thermosetting polymers have the ability for no shrinkage and as it cures the coating 250 mechanically adheres to the metal or other material used in a light bar unit 260. Polymer overlays provide usable covers 250 graphic and text. Die cutting or other suitable shearing methods are used to cut the protective coating 250 to the appropriate size. The film is secured to the light bar unit 260 in one single unit or can be partitioned to apply in sections and affixed with clear adhesives, self-adhering or other suitable applications. The covering 250 is removable or can be a single-use product. The protective covers 250 can be produced for any size light bar unit 260 or for exterior lights that are exposed to the weather, environment or the unit being stored. The cover 250 can have indicia, graphic and color and can be illuminated. Lighting can be located: on, into, interior or exterior of the cover 250. Various designs, colors or textures and any type of printing or embossing can be on the surface of the cover 250. The illumination of the protective cover 250 can be obtained by placing lighting devices on the interior or exterior of the cover. Flexible protective covers 250 are produced of suitable flexible materials. The protective covers 250 can be connected to the light bar unit 260 by using means such as, snap-on covers that simply automatically occur when the cover 250 is pushed onto the light bar unit.

By producing a lip on the housing 10 of the light bar unit 260, the cover 250 simply catches and holds onto the light bar unit's body 10 or other suitable standard means or mechanism for attaching covers 250 can be utilized. Hence, when looking at the rearward lower portion of the vehicle under the bumper area, the cover 250 conceals the top, front side, bottom and a portion of the back of the light bar unit 260 as in FIG. 6. In some configurations, the end caps 80 and the top, front side, bottom and a portion of the back would be concealed by the cover. In another example, the entire light bar unit 260 would be concealed by a protective coating 250. The protective cover 250 can have an installed lock for theft protection or can be left unlocked. The protective cover 250 can protect the light bar unit 260 and absorb the nicks and bumps from everyday bumps and bruises when not in use. Suitable weather proofing materials can be utilized during construction of the light bar unit 260 and cover 250 if the materials used are prone to breaking down if exposed to the weather.

The embodiment described is not limited in its application to the details of construction, composition or manufacturing, the arrangement of components, the illustrations and the drawings. The conception, upon which this disclosure is based, should not be considered limiting for the design of other structures, methods and systems that are described herein. It is important for the claims being regarded to include equivalent constructions that do not depart from the spirit or limited in scope the nature and essence that is described herein.

The present invention provides a supplementary light bar unit and system comprised of the combination; a light bar housing unit assembly consisting of a peripheral wall having a top and bottom surface, a vertical side surface and opposing side surfaces that form a cavity inside the housing; a securing assembly to affix the light bar housing assembly in a rearward position; and a securing assembly to affix electric plug connector connecting a light fixture assembly mounted into the light bar unit thereon. The light bar housing may be substantially rectangular or squared or oval in cross section and the shape having a front surface and a rear surface and a pair of parallel laterally opposing side surfaces; or tubular or pipe like in cross section and the shape having a front surface, rear surface and opposing side surfaces that form a cavity inside the housing; or a device for constructing, fabricated or extruded the light bar from a group of: aluminum or stainless steel, steel, plastics fiberglass, plated steel, extruded aluminum, chrome or any combination of light weight materials or compounds or other suitable materials are used; and a device for reshaping a rectangular, boxed, tubular or pipe-like the light bar housing reformed to become elongated, compressed or expanded to make different shapes; and a device for shaping the light bar housing that can be shaped or conform to the vehicle or equipment bodies exterior rearward visual lines; and a securing assembly to affix the light bar unit onto vehicles, trailers, off road farm vehicles, construction equipment or farm equipment, stationary mountings including placards and boards or wherein any supplemental positions onto/into the light bar units are utilized; and the light bar units mounting hardware is attached to: backside, front, backside and side, front and side, backside and two sides or front and two side surfaces or any other surface combination; and a securing assembly to affix a plurality of finishes such as: bright anodized finish, chrome plated, wheel abraded or other applied finishes.

The combination light fixture assembly may comprise a securing assembly to affix and insert an illumination fixture into the light bar housing; and a securing assembly to affix a plurality of the illumination fixtures; and a securing assembly to affix a plurality of light emitting diode LED light sources mounted in the light fixture housing; or a securing assembly to affix a plurality of lamps, automobile lamps, halogen, incandescent bulbs or other light emitting lamps such as strobe lights included in the light fixture housing; and a securing assembly to affix and arrange the transmission of white or multi-colored lights; and a securing assembly to affix the light fixture assembly power from a power source. The light bar housing a securing assembly to affix for holding and displaying the light fixture assembly comprising of mirrors or comprising of a reflector positioned in the light fixture housing having reflective front surfaces; or a securing assembly to affix holding and displaying the light fixture assembly comprising of mirrors or of plain surfaces; or a securing assembly to affix for holding and displaying the light fixture assembly comprising of mirrors or with textured surfaces; and a securing assembly to affix mirrors or a reflective lens assembly for reflecting light in the light fixture assembly.

The fixed or removable light fixture assembly has a device for positioning and methods for attaching into the light bar housing cavity at least one the light fixture assembly; and a device for positioning and methods for attaching into the light bar housing a plurality of end caps; and a securing assembly to affix the optional inclusion of a photo sensors in the end caps; and/or a securing assembly to affix the optional photo sensor in the light bar housing; and/or a device for positioning and methods for attaching into the light bar housing body or the end caps, the option of using at least one electric sensor; and a device for positioning and methods for attaching into the light bar housing body or the end caps, the option of using at least one the electrical sensor that can be automatically controlled based on the ambient light to sense the light and produce illumination from the illumination fixtures arranged for the optional transmission of lights; and a device to position and methods for attaching the light bar housing or the end caps at least one electrical sensors that calculates the distance between it and the object; and a device for positioning and methods for attaching into the light bar housing body or the end caps the option of using at least one illuminating light directing light; and a securing assembly to affix the lights and for directing illuminating lights: downward or outward or downward and outward from the body of the light bar unit to the pavement or ground; and a securing assembly to affix and position into the light bar housing body or the end caps the option of using at least one strobe light; and a securing assembly to affix and position and into the light bar housing body or the end caps the option of using at least one sound mechanism such as beeping to warn those behind the light bar unit when backing up.

The end caps are positioned into the light bar housing; a plurality of the end caps positioned into or onto the light bar housing; and at least one illumination fixture engaged into the light bar housing; and the illumination fixtures enclosing a plurality of light emitting diode light sources; or enclosing in the end caps a plurality of lamps or automobile lamps; and the illumination fixtures arranged for the transmission of multi-colored lights; and the end caps comprising of a plurality of lens, lights, reflectors and the light fixture assembly; and the end caps from a group comprised of: aluminum or stainless steel, steel, plastics fiberglass, plated steel, extruded aluminum, chrome, a variety of plastics, polypropylene or polyethylene, polymer compounds or any combination of light weight materials or compounds or other suitable materials.

The wiring harness assembly substantially contains brake/signal lights, flasher lights, driving lights, back-up, marker brake/signal, strobe, marker, fog, illuminating lights or other combinations of light, vehicle or equipment functions; and a securing assembly to affix the light fixture assembly containing at least one light comprising of light emitting diodes or a lamp containing incandescent bulbs or other suitable illumination devices are used; or a combination of other bulbs warning drivers or others located behind or any other viewpoint the light bar unit; and a securing assembly to affix the electrical plug to the wiring harness assembly supplying current; and a securing assembly to affix and locate the switching means in the switching and braking systems of the vehicle and coupled to the light fixture functions.

The wiring harness assembly may include a securing assembly to affix a connecting plug; and the connecting plug attached to the light fixture assembly located in the light bar unit; and the wiring harness assembly operates the light fixture assembly; and the wiring harness assembly contains: brake/signal lights, flasher lights, driving lights, back-up, marker, trailer turn brake/signal, strobe, marker, fog, illuminating lights, other combinations of light or vehicle illumination functions.

The light bar housing may include a securing assembly to affix the plug connector to the light fixture assembly; and a securing assembly to affix an adapter to a conventional the plug connector with fewer wires and affixed to another the plug connector with numerous wires; and a securing assembly to affix the plug connector with an numerous wires using a connecting the adapter to affix the plug connector with wires not equal in number; and a securing assembly to affix the wiring harness assembly that is mounted or situated in the light bar housing's cavity; and a securing assembly to affix the wiring harness assembly supplying electrical current; and a securing assembly to affix exiting the light bar housing cavity of the light bar housing through a sealable or unsealable hole in the light bar housing a securing assembly to affix a the plug connector assembly to the plug connector and then to an electrical power connection.

The light bar housing has a plurality of mounting openings having a pair of parallel, longitudinally extending sides located onto/into the light bar housing; and a plurality of the mounting openings laterally opposing side edges having a peripherally, continually and encircling side edge; and a securing assembly to affix a mounting flange onto the mounting opening and the mounting flange produced from flexible or formable materials such as nylon or other suitable materials.

The light bar housing has a securing assembly to affix the mounting flange; and a securing assembly to affix the mounting flange which is positioned onto the exterior edge of the light fixture assembly; and a securing assembly to affix the mounting flange and then positioned onto the exterior/interior of the light bar housing; and a securing assembly to affix the mounting flange that are resilient and can be cammed onto the light fixture assembly for the installation; and a securing assembly to affix the flange that can retain a tight embracing seal; and a securing assembly to affix the mounting flange that surrounds the lens openings in the housings; and a securing assembly to affix the mounting flanges that are mostly watertight when placed around the outer rims.

The light bar housing may include a securing assembly to affix a male tongue insert being the forward portion of the back plate and for attaching the back plate to the light bar unit; or a securing assembly to affix an independent the back plate on the rearward side of the light bar housing unit; and a securing assembly to affix the back plate to the rearward position of the light bar housing unit; and the back plate means being configured and arranged and a securing assembly to affix the back plate and the male tongue insert or other parts; and a device for constructing, fabricated or extruded, materials consisting of: steel, plastics, rubber, fiberglass or other strong metals to support and attach the male tongue insert; and means for configuring and arranging the male tongue insert to telescope into and out of the female receiving socket.

The back plate includes a securing assembly to affix and support the light bar housing unit offset onto the back plate to the top or bottom; or a securing assembly to affix and support the light bar housing unit centered onto the back plate; or a securing assembly to affix and support the light bar housing unit connected on the left side or on the right side onto the back plate; or a device for utilizing materials consisting of strong metals such as steel or other suitable materials for support in both the back plate and male tongue insert; and a device for utilizing suitable methods such as welding or bolting or other methods when attaching both the back plate and the male tongue insert or other parts; or a device for constructing or fabricated materials consisting of; steel or other conventional materials with strength and methods for supporting and attaching the light bar housing to the back plate.

A male tongue insert may have a device for securing into the female receiving socket a the male tongue insert and joining them with a coupling pin inserted through the male and the female coupling pin insertion holes; and a device for securing the female receiving socket around the male tongue insert and attaching a removable or permanently installed locking device; and a securing assembly to affix the locking device positioned on the coupling pin, on the exterior of the male female coupling or anywhere appropriate on the light bar unit.

The light bar housing may have a securing assembly to affix the collars/strips to the male tongue insert; a securing assembly to affix permanently attaching the collars/strips into or onto: top, bottom, sides surfaces or any combination of the surfaces that keeps vibrations or noise to a lower level; and a securing assembly to affix the collars/strips into or onto: top, bottom, sides surfaces or any combination of the surfaces that keeps vibrations or noise to a lower level; and a securing assembly to affix and ringing the outer periphery of the male tongue insert with friction reducing materials to facilitate its insertion into the female receiving socket; and a securing assembly to affix the collar/strips to the inner periphery of the female receiving socket to facilitate the insertion of the male tongue insert which keeps vibrations or noise of the couplings or sockets to a minimum; and permanent materials such as adhesives, glues or other suitable materials are used to attach the collars/strips; or the collars/strips removable materials that have the ability to be reattached such as: Velcro, magnetic or other temporary bonding materials; and a securing assembly to affix and detach quickly and easily, and a device for collars/strips to secure and utilize an adhesive backing that is formed from heat-activated adhesives.

The collars/strips reduce the vibration or noise to a lower level; a securing assembly to affix the collars/strips onto/into the mounting openings and other openings in the light bars unit; and a securing assembly to affix the collars/strips into or onto surfaces, openings orifices, cracks, slits or at joints for reducing vibrations, noise or slippage in the light bar, hitches, vehicles or trailers that move, vibrate or wiggle.

An extension bar is attached to the light bar unit housing; a device for the extension bar that is substantially rectangular, squared, round or oval in shape having a front surface, rear and opposing side surfaces that form a cavity inside the extension bar unit; and a device for the extension bar that is substantially: spring-like in shape or an extended tubular housing ringing the exterior of the light bar unit or portions of the light bar unit; and a securing assembly to affix light fixtures of any shape suitable for attaching into or onto the light bar unit or any shape with or without flat surfaces that form a cavity inside or a solid internal the extension bar unit; and a securing assembly to affix the wiring harness assembly that is mounted or situated in the extension bar unit cavity; or a securing assembly for affixing and ringing the outer periphery of the extension bar unit the wiring harness assembly; and a securing assembly to affix the extension bar of materials that are utilized in the light bar housing or other materials that are flexible such as rubber or other suitable material; and a securing assembly to affix the wiring harness assembly to the interior or exterior that is mounted or situated into or onto the extension bar unit; and a securing assembly to affix external coverings to the extension bars.

The extension bar is attached to the light bar housing is a device wherein the extension bar is substantially: tubular, pipe like in shape having a front surface, rear surface and opposing side surfaces that form a cavity inside the extension bar housing unit; and a securing assembly to affix the light fixture assembly to the extension bar housing; and a securing assembly to affix the wiring harness assembly to be affixed into or onto the interior or into or onto the exterior of the extension bar housing unit.

The protective cover is attached to the light bar unit; a device for the protective cover element fashioned to compliment the shape of the light bar unit having peripheral walls defined as: front surface, vertical side surfaces, opposing side surfaces and that forms an interior cavity inside; and a device for producing the protective covering of the light weight or rigid material such as aluminum, a variety of plastics polypropylene or polyethylene, polymer compounds, Plexiglas, fiberglass, glass, vinyl, nylon, canvas or fabrics, rubber or rubber-like materials or other suitable materials; and a device for producing the protective coating containing: polyethylene, silicone, poly film, polyester and optional Kraft papers that can be coated by such members; and a device for producing the protective cover using flexible or stretchable materials that fits snuggly over the light bar units or the extension bars; and a securing assembly to affix onto the light bar body housing the protective covers that can be connected by methods such as: magnetic fasteners, snap-on covers or other attaching device onto the light bar unit or lights; and a securing assembly to affix illumination to the protective cover by placing lighting equipment such as: halogen, light emitting diodes LED, strobe or incandescent bulbs on the interior or exterior of the protective cover; or a device to produce the protective covers with embossing, applied indicia, applied fluorescent indicia or colors.

An alignment guide is attached to the male tongue insert is a securing assembly to affix the alignment guide to the male tongue insert positioning the insert into the female receiving socket at the correct depth for the operator; and a device for positioning the guide to align up to the male inserts correct pin insertion hole pattern; and a device for positioning the pin insertion hole for attaching a lockable or unlockable the coupling pin.

A supplemental external electrical plug-in sockets supplied by electrical connections that are located in the light bar housing unit; a device for producing the external electrical plug-in socket housing wherein the housing consists of: a peripheral wall having a top, bottom, a vertical side, opposing side surfaces that form the external electrical plug-in socket housing shape located on inside and outside of the light bar housing; and a device for constructing, fabricated or extruded shape for the external electrical plug-in socket housing consisting: square, round, rectangular or oval; or a device for reshaping the external electrical plug-in socket housing to become elongated, compressed or expanded to produce different shapes; and a securing assembly to affix or place the wiring harness assembly into the interior of the external electrical plug-in socket; and a securing assembly to affix the external electrical plug-in sockets mounted through the mounting openings, mounting flanges, the light bar housing and through a securing retaining rings; and a device for delivering electrical power to independent the electrical plug-in sockets; and a securing assembly to affix and to provide external electrical plug-in sockets to the external electrical power plug; and a method for delivering power to various external connectable products; and a securing assembly to affix a lockable hinged cover attached to the external electrical plug-in sockets.

An alignment guide is attached to the male tongue insert; a securing assembly to affix the alignment guide that is attached to the male tongue insert to position the insert into the female receiving socket at the correct depth for the operator to use securing the connecting pins.

A sleeve is attached to the male tongue insert; a device wherein the sleeve substantially consists of aluminum, steel, nylon, plastic or rubber, polypropylene, polymer compounds, polyethylene, or other suitable materials; and a securing assembly to affix and provide device wherein the sleeve serves a dual purpose modified to fit two or more the female receiver hitch tubes; and a securing assembly to affix and providing a device to reduce noise, vibrations or rattles by using the sleeve, a securing assembly to affix the sleeve substantially consists of: rectangular tube approximately the same configuration as the male tongue insert from the back plate to the alignment guide; and a securing assembly to affix and cover a square bore of various sizes of the female receiving tongue.

A light bar unit may include a device to provide a quick and easy method for attaching and detach the light bar units without tools. The light bar unit may employ a device to adapt the light bar unit to utilize supplemental energy or the ability to control the light bar unit via connecting an external wireless control transmission module. A drain hole that is located in the body of the light bar housing may be provided or a compartment area including a peripheral wall having a open top compartment door opening, bottom, a vertical side, opposing side surfaces, optional back end walls that form internal the compartment; and a device wherein the compartment is located on the exterior and attached to the light bar unit or recessed into the interior of the light bar housing; and a securing assembly to affix a mounting flange, gasket, welding, sealant, or other suitable device for attaching and sealing; and a device for creating an exterior opening on the light bar unit and that a door can be constructed: as a door for a drawer that slides outward, a door for a drawer opening on the bottom, side or top, end caps acting as the door, a side door by opening the vertical side; and a device for creating an exterior opening on the light bar unit and a door that opens up to expose smaller or larger compartments attached to the light bar unit; and a device for creating an interior opening on the light bar unit and a door that exposes the entire internal area of the light bar unit's housing, a door that exposes smaller or larger internal compartments; and a device for attaching suitable fasteners that can be applied for the doors for the compartments located on or in the light bar unit; and a securing assembly to affix and provide a device wherein an optional locking mechanism for the door on or into the drawer is provided.

The device for producing and providing a securing assembly to affix and provide device wherein the plastic film coating or covering materials with an adhesive layer sized, shaped, cut or die cutting methods can be used to produce an entire rear surface for the covering; and a device to produce and utilize a suitable method to cut or die cut openings or produces openings to matching up to the openings in the light bar unit; and a securing assembly to affix and provide device wherein the plastic film coating or covering is a nonstick cover and is a self-adhering cover that is affixed to a release backing, liner or film; and a device for the plastic film material to secure and utilize an adhesive backing that is formed from heat-activated adhesives.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A safety light bar capable of being inserted into a vehicle mounting hitch comprising:
    a tubular-shaped light bar housing having peripheral walls including a top and bottom surface, a vertical side surface and an opposing side surface containing a plurality of openings adapted to receive indicators, the peripheral walls collectively forming a storage cavity inside the light bar housing and opposing open ends at least one of which permits access to the storage cavity;
    a plurality of end caps located at said open ends of the light bar housing, wherein the end caps are hingedly attached to the light bar housing;
    a light fixture assembly comprising a wiring harness and a plurality of lights electrically connected to the wiring harness and an electrical plug connector for electrical connection of the wiring harness to a power source, the electrical plug connector being mounted with respect to the light bar housing; and
    a fastening device for affixing said light bar housing to a mounting element adapted to be inserted into the vehicle hitch.

2. The safety light bar according to claim 1, wherein a cross-section of said light bar housing is substantially rectangular-shaped in cross section.

3. The safety light bar according to claim 1, wherein said light bar is formed from a lightweight material selected from a group consisting of aluminum, stainless steel, ferrous steel, plastic, fiberglass, plated steel, extruded aluminum and chrome.

4. The safety light bar according to claim 1, wherein said fastening device includes mounting hardware for attaching said housing to the mounting hitch.

5. The safety light bar according to claim 1, wherein said light bar housing is provided with at least one finish selected from the group consisting of bright anodized finish, chrome plated finish, and wheel abraded finish.

6. The safety light bar according to claim 1, further comprising at least one light fixture positioned to direct light downward and outward away from the light bar housing.

7. The safety light bar according to claim 1, further comprising at least one sound mechanism within said light bar housing for providing a warning sound for a coordinated reverse operation with a light fixture providing a reverse light.

8. The safety light bar according to claim 1, wherein said electric plug connector is part of a wiring harness assembly having a plurality of wires, said wiring harness assembly including at least two lights from the group consisting of brake signal lights, turning lights, driving lights, reverse lights, trailer signal lights, strobe lights, marker lights, and fog lights.

9. The safety light bar of claim 1, further comprising:
    a plurality of mounting flanges adapted to receive and secure the plurality of lights to the light bar housing,
    wherein the lights include at least one of a light emitting diode, incandescent lights, halogen lights, strobe lights, and colored lights.

10. The safety light bar of claim 1, wherein the storage cavity includes a plurality of compartments.

11. The safety light bar of claim 1, wherein the plurality of lights are connected via the wiring harness to vehicle circuits for operating a combination of at least two categories of lights including brake/signal lights, flasher lights, driving lights, back-up lights, marker brake/signal lights, strobe lights, marker lights, and fog lights.

12. The safety light bar of claim 1, further comprising:
an adapter to connect the plug connector with a second plug connector adapted to hold a different number of wires than the number held by the plug connector.

13. The safety light bar of claim 1, further comprising a resilient securing assembly adapted to affix said mounting element which is positioned onto the exterior edge of said light fixture assembly.

14. The safety light bar of claim 1, further comprising a securing assembly adapted to affix said wiring harness assembly to the light bar housing.

15. The safety light bar according to claim 1, said light bar housing further comprising:
a reflective device having at least one reflective surface; and
a fastening device for holding said at least one reflective surface within said light bar housing.

16. The safety light bar according to claim 15, wherein said reflective device is a mirror or a reflector.

17. The safety light bar according to claim 1, further comprising a device for sensing low light, said device for sensing low light including at least one electrical sensor for automatically controlling illumination from said illumination fixtures based on the ambient light sensed by the device for sensing low light.

18. The safety light bar according to claim 17, further comprising at least one electrical sensor for calculating a distance between the at least one electrical sensor and an object in the vicinity of the safety light bar.

19. The safety light bar according to claim 1, further comprising a plurality of end caps adapted to be secured to ends of the light bar housing.

20. The safety light bar according to claim 19, further comprising a photo sensor assembly within said end caps.

21. The safety light bar according to claim 19, further comprising a photo sensor assembly within said light bar housing.

22. The safety light bar according to claim 19, further comprising a lockable panel for at least one of the opposing open ends for providing a secure light bar housing cavity.

23. The safety light bar according to claim 1, said light fixture assembly further comprising:
a plurality of mounting flanges,
a plurality of lighting fixtures, and
the plurality of openings formed in the light bar housing being for respectively accommodating the mounting flanges and-the lighting fixtures.

24. The safety light bar according to claim 23, wherein said lighting fixtures include a plurality of light emitting diode (LED) light sources mounted in said light fixture housing.

25. The safety light bar according to claim 23, wherein said lighting fixtures include at least one of an automobile lamp, a halogen lamp, an incandescent bulb, and a strobe light.

26. The safety light bar according to claim 23, further comprising white or multi-colored lights within the light fixture assembly.

27. The safety light bar according to claim 23, wherein said lighting fixtures include at least two lights selected from the group consisting of a light emitting diode (LED) light source, an automobile headlamp, a halogen lamp, an incandescent bulb, and a strobe light.

28. The safety light bar of claim 23, further comprising an extended tubular housing ringing at least a portion of the exterior of the light bar housing.

29. A safety light bar capable of being inserted into a vehicle mounting hitch comprising:
a tubular-shaped light bar housing having peripheral walls including a top and bottom surface, a vertical side surface and an opposing side surface that collectively form a storage cavity inside the light bar housing, and having open ends;
a plurality of end caps located at said open ends of the light bar housing, wherein the end caps are hingedly attached to the light bar housing;
a light fixture assembly mounted within the light bar housing;
a fastening device for affixing said light bar housing to a mounting element adapted to be inserted into the vehicle hitch;
an electric plug connector adapted to connect the light fixture assembly mounted into said light bar housing to a power source;
a back plate being attached to said light bar housing; and
a male tongue insert forming a portion of said back plate and for attaching said back plate to a female receiving socket within said mounting hitch.

30. The safety light bar according to claim 29, further comprising a coupling pin adapted to operatively secure the male tongue insert with said female receiving socket by a insertion of the coupling pin inserted through a pair of respective male and female coupling pin insertion holes.

31. The safety light bar according to claim 29, further comprising end caps at least one of which includes a lockable panel for providing a security compartment within said light bar housing.

32. The safety light bar according to claim 29, further comprising a locking device for securing said female receiving socket with said male tongue insert.

33. The safety light bar of claim 29, further comprising an alignment guide attached to said male tongue insert to permit insertion of the male tongue insert into said female receiving socket at a predetermined depth.

34. A safety light bar capable of being inserted into a vehicle mounting hitch comprising:
a light bar housing having peripheral walls including a top and bottom surface, a vertical side surface and an opposing side surface that collectively form a storage cavity inside the light bar housing, and having open ends;
a light fixture assembly being mounted to the light bar housing;
a fastening device for affixing said light bar housing to a mounting element adapted to be inserted into the vehicle hitch;
an electric plug connector connecting the light fixture assembly mounted into said light bar housing to a power source; and
a plurality of end caps adapted to be secured to ends of the light bar housing,
wherein the end caps are hingedly attached to the light bar housing.

35. A safety light bar capable of being inserted into a vehicle mounting hitch comprising:
a light bar housing having peripheral walls including a top and bottom surface, a vertical side surface and an opposing side surface that collectively form a storage cavity inside the light bar housing, and having open ends;

a light fixture assembly mounted within the light bar housing;

a fastening device for affixing said light bar housing to a mounting element adapted to be inserted into the vehicle hitch;

an electric plug connector adapted to connect the light fixture assembly mounted into said light bar housing to a power source;

a back plate being attached to said light bar housing;

a male tongue insert forming a portion of said back plate and for attaching said back plate to a female receiving socket within said mounting hitch for engaging the male tongue insert; and a plurality of end caps adapted to be secured to ends of the light bar housing, wherein the end caps are hingedly attached to the light bar housing.

* * * * *